(12) United States Patent
Liu et al.

(10) Patent No.: US 7,854,979 B2
(45) Date of Patent: Dec. 21, 2010

(54) MEMO PAD INCLUDING MEMO SHEETS THAT CAN PRESENT A THREE-DIMENSIONAL APPEARANCE

(75) Inventors: Jen-Rong Liu, Kaohsiung Hsien (TW); Chin-Chung Tsai, Taipei Hsien (TW)

(73) Assignee: Taiwan Hopax Chems. Mfg. Co., Ltd., Kaohsiung Hsien (TW)

( * ) Notice: Subject to any disclaimer, the term of this patent is extended or adjusted under 35 U.S.C. 154(b) by 677 days.

(21) Appl. No.: 11/937,260

(22) Filed: Nov. 8, 2007

(65) Prior Publication Data

US 2009/0123685 A1    May 14, 2009

(51) Int. Cl.
*B32B 9/00* (2006.01)
*B32B 33/00* (2006.01)

(52) U.S. Cl. .................. 428/40.1; 428/42.1; 428/194

(58) Field of Classification Search .......... 428/40.1, 428/41.6, 41.8, 42.1, 343; 283/72, 100, 101, 283/106; 24/67 AR
See application file for complete search history.

(56) References Cited

U.S. PATENT DOCUMENTS 4,768,810 A * 9/1988 Mertens ................ 462/26
5,575,574 A * 11/1996 Mertens ............... 400/118.2
5,965,225 A * 10/1999 Torres ................. 428/40.1
2008/0063842 A1* 3/2008 Callinan et al. ......... 428/192

FOREIGN PATENT DOCUMENTS

FR    2839009 A1 * 10/2003

OTHER PUBLICATIONS

Derwent translation of FR 2839009, 2003.*

* cited by examiner

*Primary Examiner*—Patricia L Nordmeyer
(74) *Attorney, Agent, or Firm*—Frommer Lawerence & Haug LLP; Ronald R. Santucci

(57) ABSTRACT

A memo pad includes a stack of memo sheets, each memo sheet including an inscribing portion, a pair of supporting portions, a pair of adhering portions, and a pair of adhesive layers. The adhesive layers are applied to the bottom side of the adhering portions such that an upper one of the memo sheets is adhered releasably to a lower one in the stack. When a memo sheet is removed from the memo pad, and the adhesive layers are used to attach the adhering portions to a supporting surface, the supporting portions are disposed to support the inscribing portion such that the inscribing portion is raised relative to the supporting surface, thereby configuring the memo sheet to present a three-dimensional appearance.

2 Claims, 7 Drawing Sheets

MEMO PAD INCLUDING MEMO SHEETS THAT CAN PRESENT A THREE-DIMENSIONAL APPEARANCE

BACKGROUND OF THE INVENTION

1. Field of the Invention

This invention relates to a memo pad, more particularly to a memo pad having stacked repositionable memo sheets that have an inscribing portion, a pair of supporting portions, a pair of adhering portions, and a pair of adhesive layers.

2. Description of the Related Art

FIG. 1 illustrates a conventional memo pad 1 that has a plurality of memo sheets 11, each sheet 11 having top and bottom sides 110, 112. The bottom side 112 of each memo sheet 11 is coated with an adhesive layer 113 adjacent to a rear edge 114 of the memo sheet 11 for securing releasably the memo sheets 11 in a stack and for permitting repositionable attachment of the memo sheets 11 to the surface of objects.

When adhered to the surface of objects, the conventional memo sheets 11 present a flat, two-dimensional appearance that often makes their presence among stacks of paperwork difficult to detect. Important messages may thereby be overlooked or lost.

SUMMARY OF THE INVENTION

Therefore, the object of the present invention is to provide a memo pad having memo sheets capable of overcoming the aforementioned drawback of the prior art.

According to the present invention, there is provided a memo pad that comprises a stack of memo sheets, an upper one of the memo sheets being adhered releasably to a lower one of the memo sheets in the stack. Each of the memo sheets includes: an inscribing portion having top and bottom sides and opposite outer edges; a pair of supporting portions, each of which extends from a respective one of the outer edges of the inscribing portion, is folded toward the bottom side of the inscribing portion, and has a bottom side and an inner edge distal from the respective one of the outer edges of the inscribing portion; a pair of adhering portions, each of which extends from the inner edge of a respective one of the supporting portions, is folded toward the bottom side of the respective one of the supporting portions, and has a bottom side; and a pair of adhesive layers, each of which is applied to the bottom side of a respective one of the adhering portions such that the upper one of the memo sheets is adhered releasably to the lower one of the memo sheets in the stack. When the upper one of the memo sheets is removed from the lower one of the memo sheets in the stack, the adhesive layers are adapted to attach the adhering portions to a supporting surface, and the supporting portions are disposed to support the inscribing portion such that the inscribing portion is raised relative to the supporting surface.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE EMBODIMENT

Figure 1:
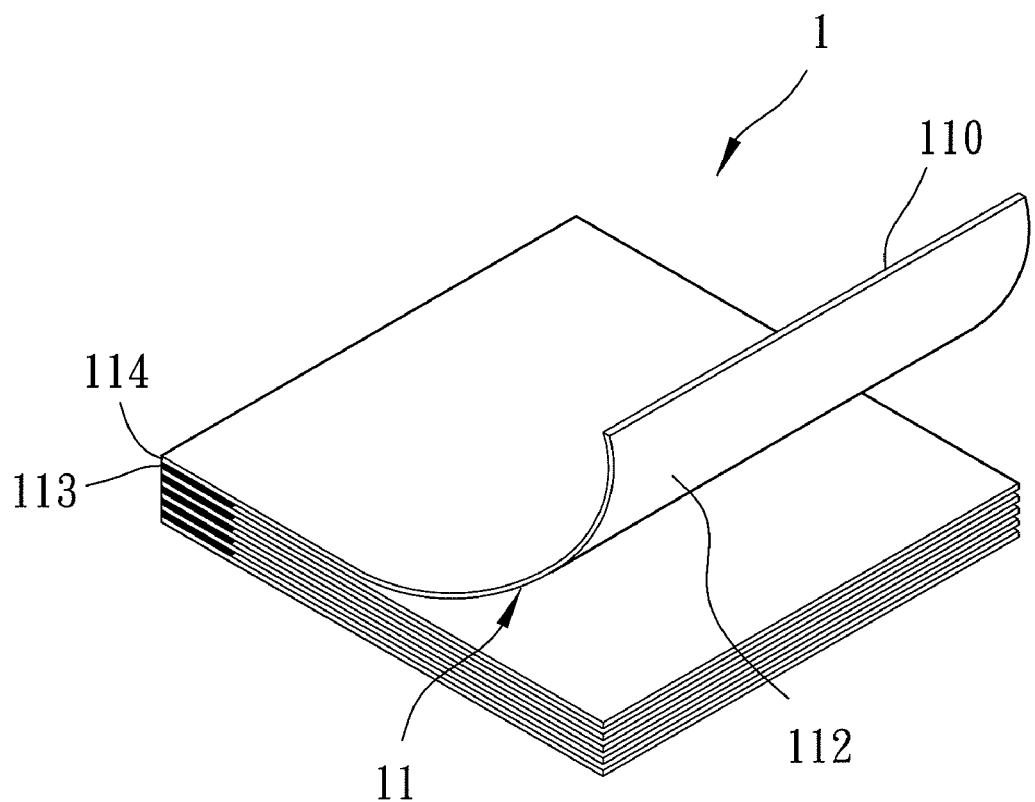
FIG. 1 is a perspective view of a conventional memo pad.

Before the present invention is described in greater detail with reference to the preferred embodiment, it should be noted herein that like elements are denoted by the same reference numerals throughout the disclosure.

Figure 2:
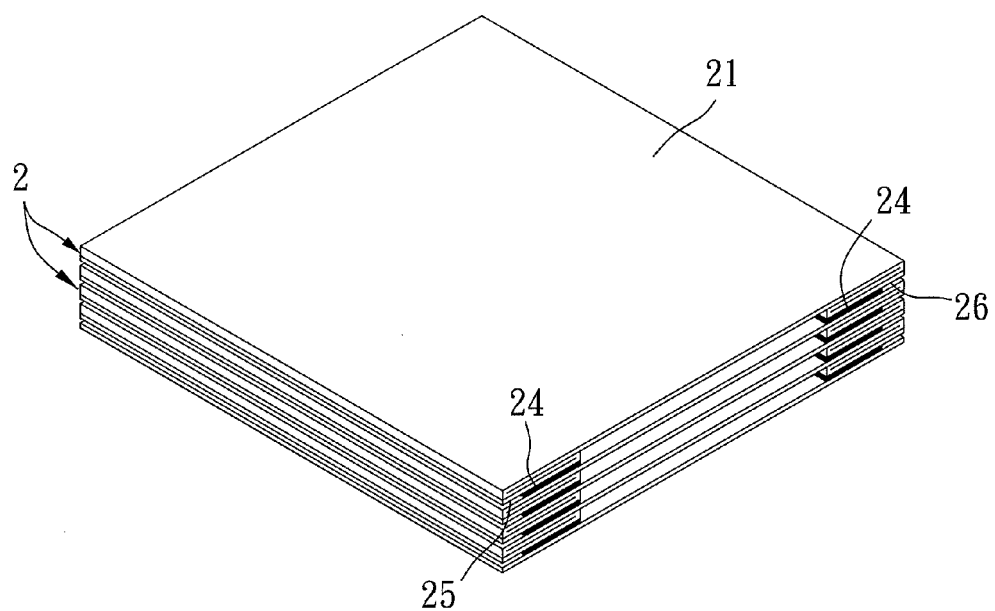
FIG. 2 is a perspective view of a preferred embodiment of a memo pad according to this invention.
Figure 3:
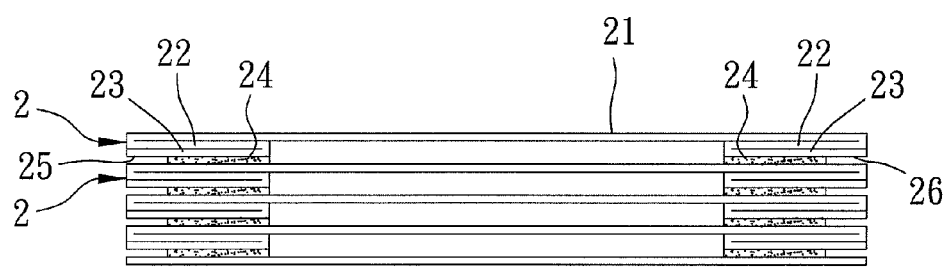
FIG. 3 is a schematic side view of the memo pad of FIG. 2.

FIGS. 2 and 3 illustrate a preferred embodiment of a memo pad according to this invention. The memo pad includes a stack of memo sheets 2, an upper one of the memo sheets 2 being adhered releasably to a lower one of the memo sheets 2 in the stack. Each memo sheet 2 has an inscribing portion 21, a pair of supporting portions 22, a pair of adhering portions 23, and a pair of adhesive layers 24.

Figure 4:
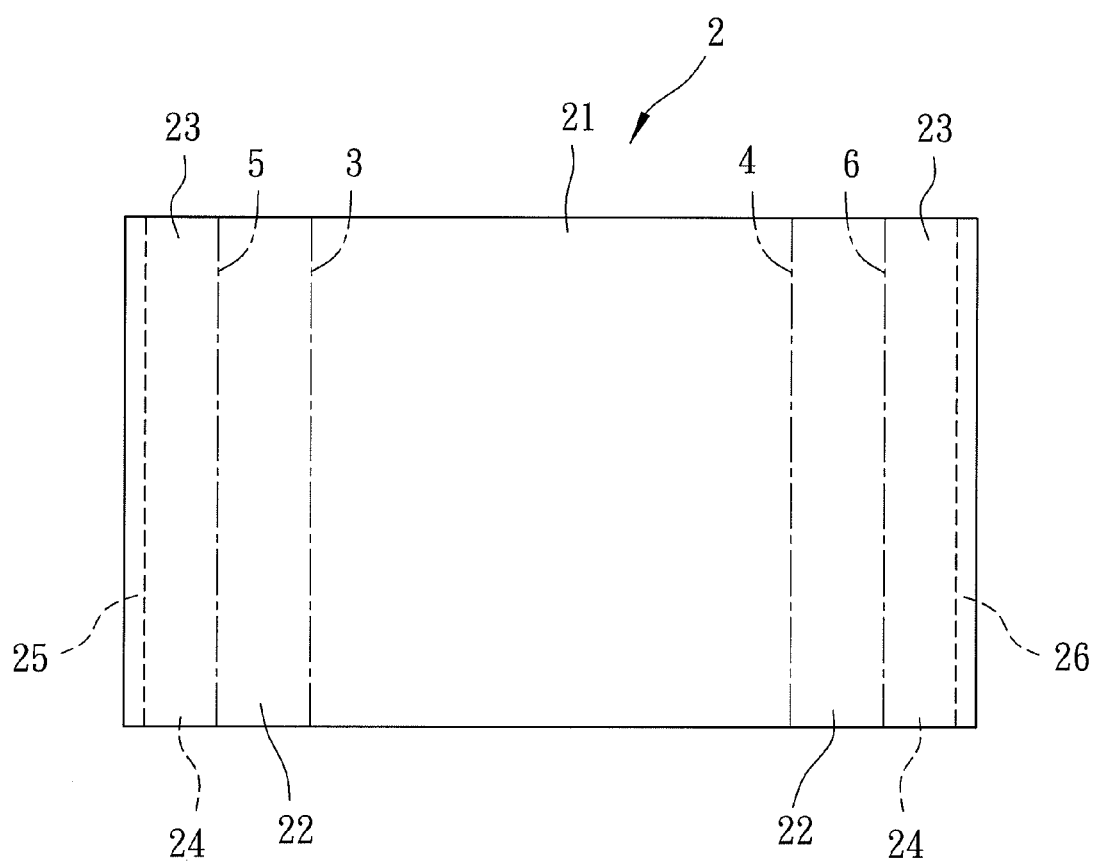
FIG. 4 is a schematic top view of a memo sheet of the memo pad of FIG. 2.

With further reference to FIG. 4, which illustrates an unfolded state of one of the memo sheets 2, the inscribing portion 21 has top and bottom sides, and opposite outer edges 3, 4. Each of the supporting portions 22 extends from a respective one of the outer edges 3, 4 of the inscribing portion 21, is folded toward the bottom side of the inscribing portion 21, and has an inner edge 5, 6 distal from the respective one of the outer edges 3, 4 of the inscribing portion 21. Each of the adhering portions 23 extends from the inner edge 5, 6 of a respective one of the supporting portions 22, and is folded toward the bottom side of the respective one of the supporting portions 22. Each of the adhesive layers 24 is applied to the bottom side of a respective one of the adhering portions 23. In this embodiment, the bottom side of each adhering portion 23 has an outer edge section 25, 26 distal from the inner edge 5, 6 of the respective supporting portion 22 and free of the respective adhesive layer 24.

Figure 5:
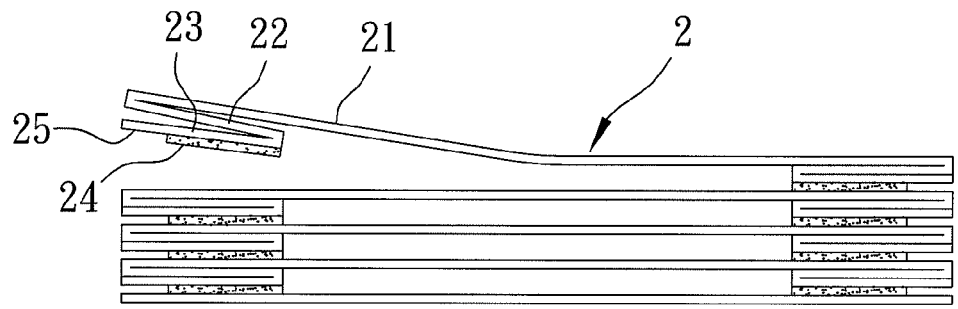
FIGS. 5 and 6 are schematic side views illustrating how removal of a memo sheet from the memo pad of FIG. 2 can be conducted.
Figure 6:
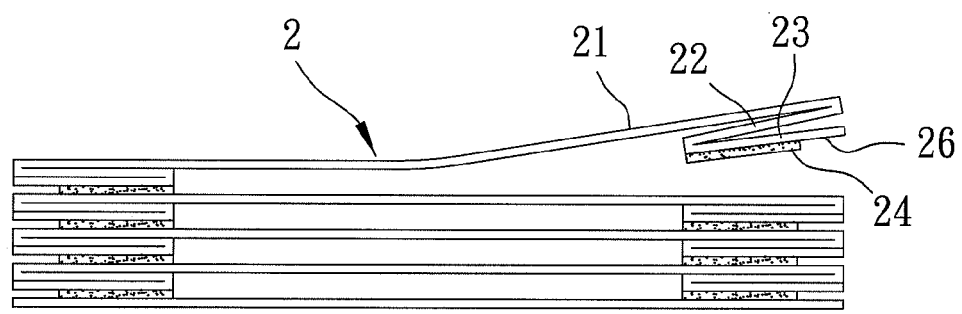

FIGS. 5 and 6 illustrate how a gap approximately equal to the thickness of the adhesive layers 24 is formed between the outer edge sections 25, 26 of the bottom side of the adhering portions 23 of an upper one of the memo sheets 2 and the inscribing portion 21 of a lower one of the memo sheets 2 when the upper one is adhered to the lower one in the stack. The gap allows handling of the upper memo sheet 2 for peeling away from the stack after having written on the top side of the inscribing portion 21.

Figure 7:
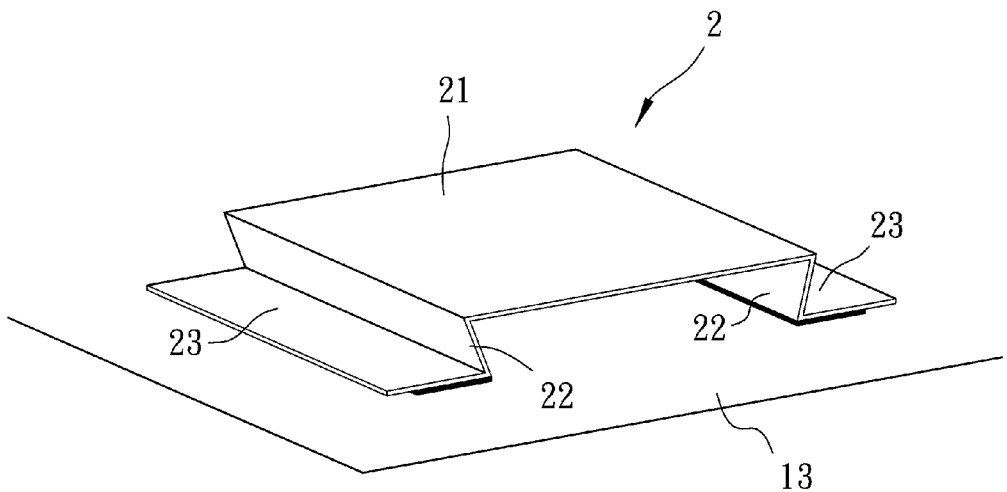
FIG. 7 is a perspective view of a memo sheet of the memo pad of FIG. 2 when attached to the surface of an object.
Figure 8:
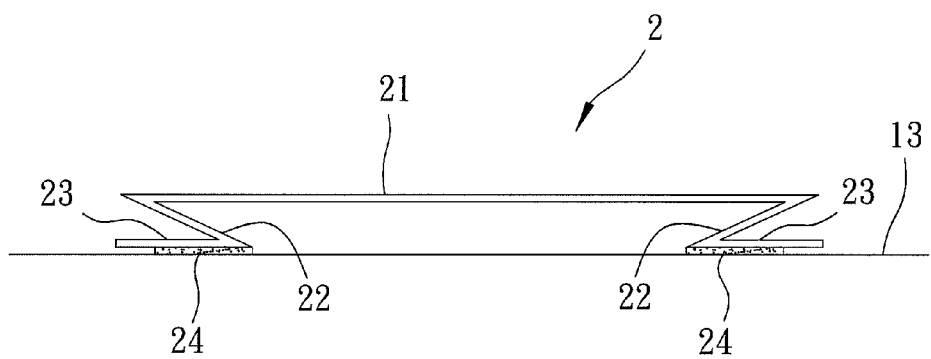
FIG. 8 is a schematic side view of a memo sheet of the memo pad of FIG. 2 when attached to the surface of an object.

FIGS. 7 and 8 illustrate how the peeled memo sheet 2 may be adhered to a supporting surface 13 (such as a tabletop) through the adhesive layers 24 on the adhering portions 23. The supporting portions 22 raise the inscribing portion 21 relative to the supporting surface 13 such that the memo sheet 2 presents a three-dimensional, eye-catching appearance, thereby eliminating the aforesaid drawback associated with the prior art.

Figure 9:
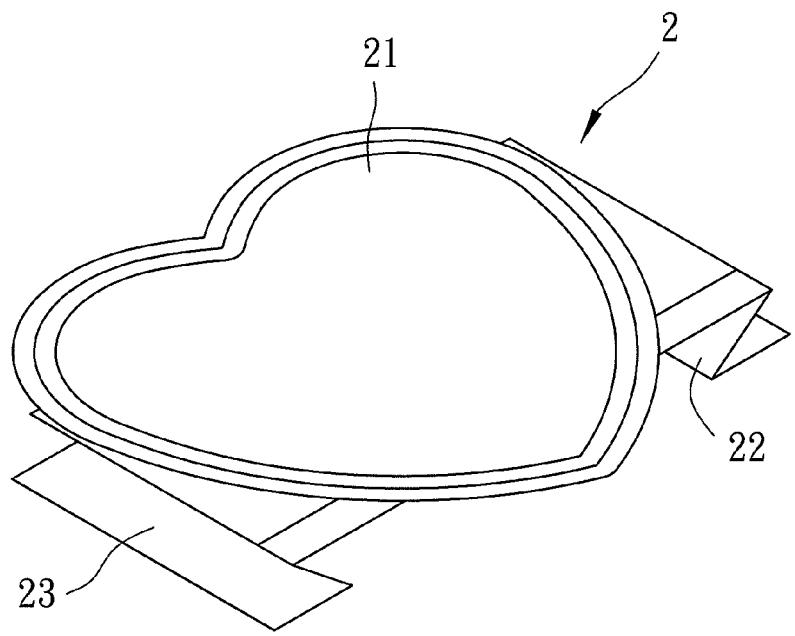
FIGS. 9 to 12 are perspective views to illustrate possible modifications of the memo sheets of the memo pad of FIG. 2.
Figure 10:
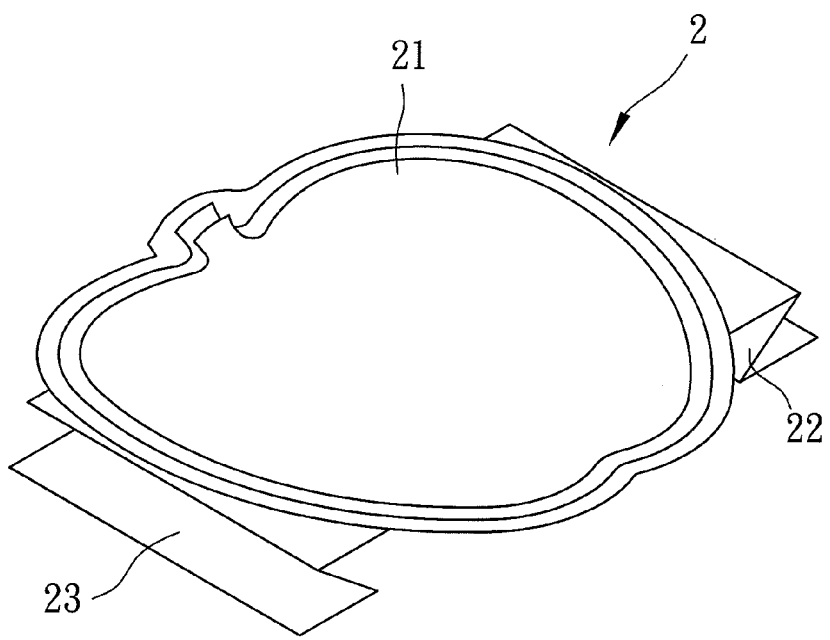
Figure 11:
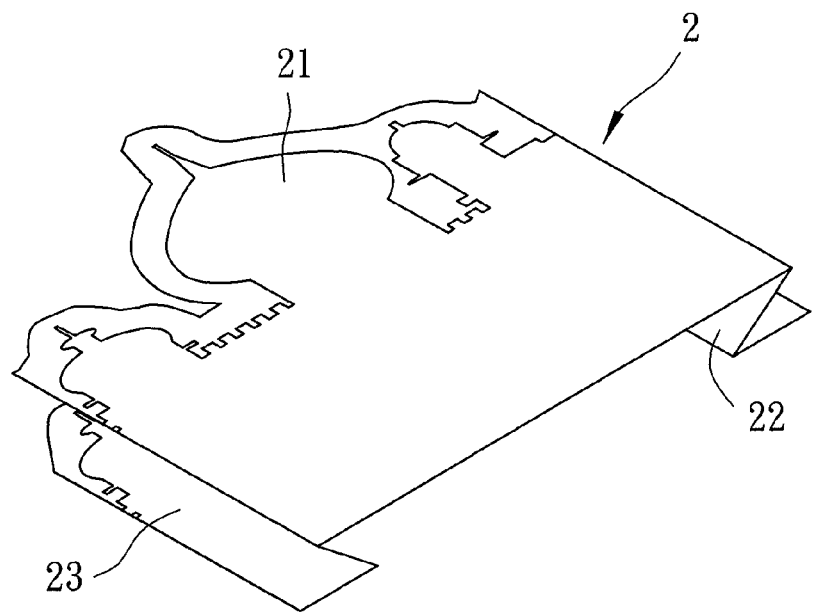
Figure 12:
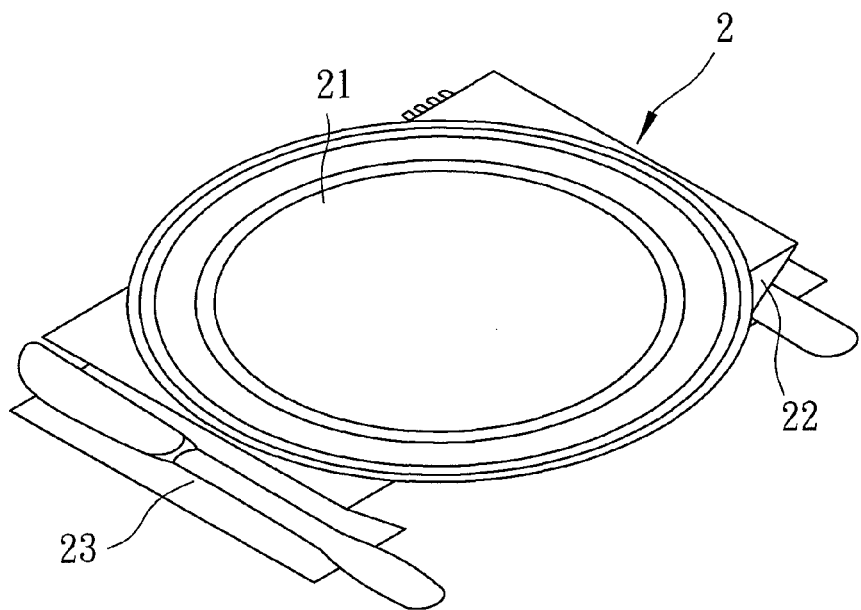

FIGS. 9 to 12 illustrate possible modifications of the memo sheets 2 of the memo pad of this invention. In FIG. 9, the inscribing portion 21 of the memo sheet 2 can be designed to present a heart-shaped appearance. In FIG. 10, the inscribing portion 21 of the memo sheet can be designed to present an apple-shaped appearance. In FIG. 11, the memo sheet 2 can be designed to present a castle-shaped appearance. In FIG. 12, the memo sheet 2 can be designed to present the appearance of a plate and cutlery.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A memo pad comprising a stack of memo sheets, an upper one of said memo sheets being adhered releasably to a lower one of said memo sheets in said stack, wherein each of said memo sheets includes
   an inscribing portion having top and bottom sides and opposite outer edges,
   a pair of supporting portions, each of which extends from a respective one of said outer edges of said inscribing portion and is folded toward said bottom side of said inscribing portion, each of said supporting portions having a bottom side and an inner edge distal from the respective one of said outer edges of said inscribing portion,
   a pair of adhering portions, each of which extends from said inner edge of a respective one of said supporting portions and is folded toward said bottom side of the respective one of said supporting portions, each of said adhering portions having a bottom side, and
   a pair of adhesive layers, each of which is applied to said bottom side of a respective one of said adhering portions such that said upper one of said memo sheets is adhered releasably to said lower one of said memo sheets in said stack,
   wherein, when said upper one of said memo sheets is removed from said lower one of said memo sheets in said stack, said adhesive layers are adapted to attach said adhering portions to a supporting surface, and said supporting portions are disposed to support said inscribing portion such that said inscribing portion is raised relative to the supporting surface.

2. The memo pad as claimed in claim 1, wherein said bottom side of at least one of said adhering portions has an outer edge section distal from said inner edge of the respective one of said supporting portions and free of the respective one of said adhesive layers to facilitate removal of said upper one of said memo sheets from said lower one of said memo sheets in said stack.

* * * * *